Dec. 17, 1929.    A. FRIEDMAN    1,740,421
RELIEF VALVE
Filed Feb. 12, 1926
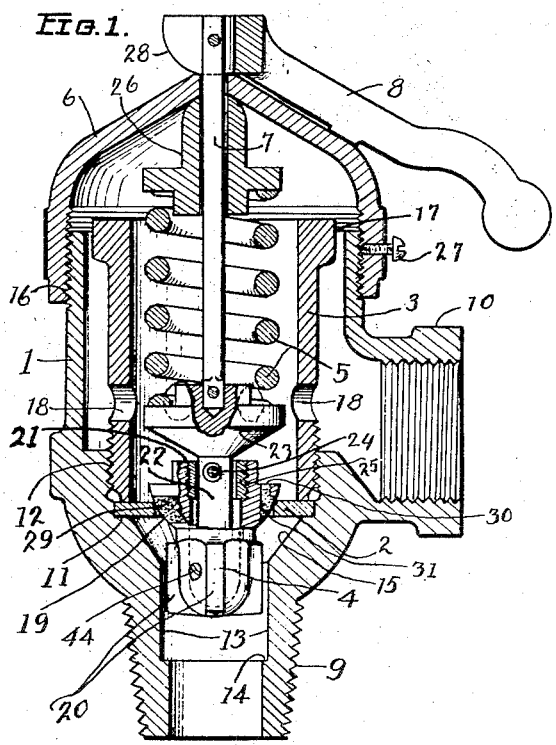
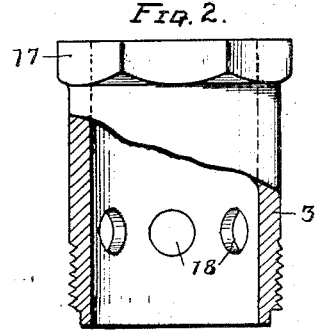
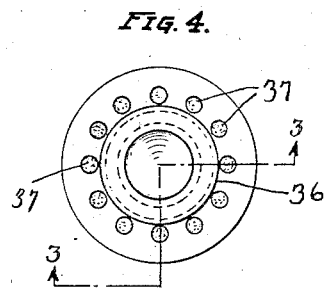
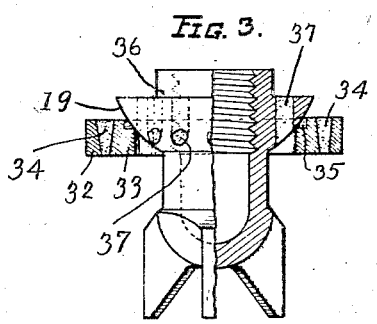
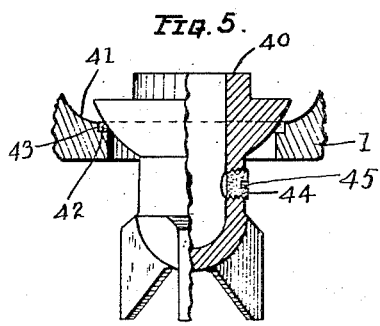
Inventor
ARTHUR FRIEDMAN.
By Evans and McCoy
Attorneys Patented Dec. 17, 1929

1,740,421

UNITED STATES PATENT OFFICE

ARTHUR FRIEDMAN, OF CLEVELAND, OHIO, ASSIGNOR TO THE CLEVELAND HEATER COMPANY, OF CLEVELAND, OHIO, A CORPORATION OF OHIO

RELIEF VALVE

Application filed February 12, 1926. Serial No. 87,747.

This invention relates to improvements in relief valves and it particularly pertains to a relief valve that is responsive to both abnormal temperatures and abnormal pressures, this application being a continuation in part of my co-pending applications, Serial No. 740,-749 and Serial No. 64,483, respectively filed on September 30, 1924, and October 24, 1925, both relating to relief valves.

The improved relief valve structure herein described is particularly designed and adapted for use in connection with automatic hot water storage systems and the like. The valve structure is of simple and inexpensive construction embodying an adjustable spring controlled valve head that is normally adapted to afford relief when subjected either to predetermined pressures, or predetermined temperatures. The valve head and valve gear are carried by a readily removable valve cap that also constitutes means for changing the pressure exerted by the valve head on the valve seat. The valve head for the structure has a supplemental relief passageway that is normally closed by fusible material and that is adapted to provide supplemental relief when the valve head is subjected to predetermined abnormal temperatures. The responsiveness of the fusible material of the valve head to predetermined temperatures is independent of the responsiveness of the valve head to predetermined pressures.

The valve structure herein proposed is so arranged that the valve head is readily accessible and may very readily be removed and repaired by inserting a new fusible element or replaced by unscrewing it from the valve gear assembly. This avoids the need of replacing the fusible valve seat as in my co-pending applications. The spring pressed valve head normally releases in response to abnormal pressures and, therefore, the valve head normally remains intact and does not require replacement except under unusual conditions where a dangerous temperature increase occurs without a corresponding pressure increase or when the valve head sticks and fails to operate and the pressure increase is accompanied by a corresponding temperature increase.

One of the objects of this invention is to provide a pressure controlled valve head with supplemental relief passageways that are normally sealed and that are adapted to open only when subjected to predetermined abnormal temperatures within the operating range of the remainder of the valve structure.

Another object of this invention is to provide a valve head with a spherical seating surface operating in conjunction with a soft metal seat that will give a substantially fluid-tight seat regardless of the alignment of the axis of the valve head with the axis of the valve seat and of minor irregularities in the seating faces.

An additional object of this invention is to provide a readily replaceable valve head, for use in a relief valve structure, with readily replaceable inserts of fusible material that are adapted to close supplemental relief passages formed in the valve head in order that renewals of the thermally responsive elements of the relief valve may be easily and quickly made.

A further object of this invention is to so construct the valve head that the fusible material used to close the supplemental relief passages in the valve head also constitutes a seating face for the valve head of relatively soft metal.

An additional object of this invention is to provide a frangible seat for a pressure controlled valve head that has supplemental relief ports formed therein, that automatically ruptures or distorts to thereby permanently unseat the valve head.

Another object of this invention is to provide a valve structure in which the valve head and valve gear are carried by the valve cap and removable therewith as a unitary assembled structure.

With the above mentioned and other objects in view, the invention consists in the novel construction, arrangement and combination of parts, hereinafter described, illustrated in some of its embodiments in the accompanying drawings, and particularly pointed out in the appended claims.

Referring to the drawings forming a part of this specification:

Figure 1 is a central sectional view of a relief valve structure constructed in accordance with this invention;

Fig. 2 is a side elevational view, shown partly in section of the valve cage removed from the remainder of the structure;

Fig. 3 is an enlarged view of a modified form of valve seat and valve head adapted for use in the valve structure shown in Fig. 1;

Fig. 4 is an enlarged top plan view of the valve head removed from the valve assembly;

Fig. 5 is an enlarged view, partially in side elevation and partially in section, of a modified form of valve head having a readily replaceable fusible insert, the valve head being shown in conjunction with an improved valve seat.

The relief valve structure shown in Fig. 1 of the accompanying drawing comprises a valve casing 1 having a valve seat 2 removably secured therein by a valve cage 3. A valve head 4 is held in yielding engagement with the valve seat 2 by a spring 5, the pressure of which may be adjusted by turning the screw threaded cap 6 that is mounted on the valve casing. A valve stem 7, that is connected at one end to the valve head and at the other end to a manually operated valve actuating lever 8, which provides means for manually lifting the valve head from the valve seat for purposes of inspection or in order to open the valve for other reasons.

The valve casing is preferably formed of a metal casting having a threaded stem 9, by means of which the valve is connected to the system with which it is adapted to be used, and a branch stub 10 that is threaded for connection to any suitable conduit (not shown) that is adapted to receive the relieved fluids passing through the valve.

The valve seat 2 is adapted to be securely seated on an annular shoulder 11 that is formed in the casing by the removable valve cage 3. A threaded portion 12 of the casing adjoining the shoulder engages the correspondingly threaded lower end of the valve cage 3. The valve casing also has a cylindrical portion 13 that terminates in an annular shoulder 14. The cylindrical portion 13 serves as a guide face for the valve head. The annular shoulder 14 serves as a supplemental stop for limiting the movement of the valve head upon rupture of the valve seat as hereinafter described. The portion of the valve casing adjacent the annular shoulder 11 and underlying the valve seat 2 is cut away by forming the conical face 15 in order to provide sufficient space around the valve head to permit the escape of the relieved fluids upon rupture of the valve seat. The upper portion 16 of the valve casing is suitably threaded to receive the valve cap 6.

The ring shaped valve seat 2 is removably secured in place by the valve cage 3, the lower end of which is threaded to engage the correspondingly threaded portion 12 of the valve casing and the upper end of which extends above the side walls of the casing 1 and has a portion 17 that is adapted to be engaged by a suitable wrench (not shown) for its removal and replacement. A series of relief ports 18 are formed in the valve cage in order to provide suitable passages to the branch stub 10 for the relieved fluids passing through the valve.

The valve head 4 has a spherical valve seating face 19 that engages the valve seat 2, a plurality of guide wings 20 that extend outwardly therefrom to engage the cylindrical guide portion 13 of the valve casing to assist in maintaining the valve head centrally disposed with respect to the valve seat, and a hollow depending body portion carrying screw threads 21 adjacent its open end by means of which the valve head is connected to the valve gear. The lower extremities of the guide wings 20 are adapted to seat on the annular shoulder 14 of the casing in the event that the valve seat is ruptured, to thereby maintain an open passage through the valve for relieved fluids after the rupture of the valve seat.

The valve head is pivotally carried by the stem 22 of a spring saddle 23. A loosely fitting transverse pivot rod 24 is secured within a threaded collar 25. The pivot 24 is preferably smaller than the opening through the stem 22 and the threaded collar 25 is larger than the stem 22 in order that the valve head may shift laterally of the stem 22 to insure firm seating engagement of the valve head on the valve seat. The lower end of the stem 22 engages the closed end of the depending body portion of the valve head well below the seating face of the valve head in order to so apply the pressure of the spring 5 to the valve head as to permit the valve head to be self-adjusting on the valve seat. The upper end of the spring abutment 23 has a suitable spring receiving seat formed thereon that is adapted to receive the lower end of the spring 5. The upper end of the helical spring 5 engages a corresponding seat formed on a spring abutment sleeve 26 that is adapted to seat against the valve cap 6 to thereby impose adjustable yielding seating pressure on the valve head that is regulated in intensity by turning the threaded valve cap 6. A screw 27 serves to lock the valve cap in its adjusted position.

The lower end of the valve stem 7 is pivotally secured to the spring abutment 23 and the upper end slidably fits within the sleeve 26 and extends through a suitable aperture formed in the valve cap 6. A valve testing lever 8 that has a pair of spaced cam portions 28 between which the valve stem 7 is pivotally mounted, is arranged to lift the valve head 4 from the valve seat 2 for testing the valve or for other purposes when it is swung about its pivotal connection with the valve stem 7, to substantial alignment therewith. The valve remains in an open position so long as the testing lever 8 occupies this position.

The valve seat 2 of the valve structure may be formed of an annular ring of friable material that will rupture when subjected to abnormal pressures, although any suitable valve seat can be used. The material from which such a valve seat is constructed can either be of vitreous character, such as glass or the like, or of any other material that will provide a suitable seat for the valve head. It is desirable to so construct the valve seat that it will rupture at predetermined pressures that are dangerous to the system protected by the relief valve in the event that the valve head 4 sticks on its seat and fails to operate. This insures relief from dangerous pressures developed in the system.

The valve head 4 has a seating surface that is formed of a relatively soft fusible metal that is adapted to reseat after its operation or after its movement relative to the valve seat 2 to again establish a substantially fluid tight closure for the valve seat. A form of relatively soft metal adapted to fuse at the desired temperature has been found to be very satisfactory. This removes the necessity of replacing the valve seat 2 except after a rupture of the seat from excessive pressures not accompanied by a dangerous temperature. The failure of the valve head to operate when subjected to abnormal pressures developed in the system may give rise to such a condition.

The valve head 4 is also provided with a plurality of supplemental relief ports 30 that communicate with an annular groove 31 which carries an insert 29 of metal or other material of a character adapted normally to seal the supplemental relief passageway. This construction permits the fusible metal 29 to also constitute a seating face for the valve head of relatively soft or yielding material.

The operation of the valve structure previously described is substantially as follows: When predetermined abnormal pressures are developed within the system with which the relief valve is used, the pressure upon the valve head 4 normally lifts the valve head from its seat and provides relief for the system. If, however, the valve head 4 becomes cemented to the valve seat 2 by reason of corrosion or the sticking of the valve head from any cause, the valve seat 2 is then adapted to rupture when the pressure of the system reaches a predetermined value. It is usually very desirable to set the valve so that the valve head 4 will operate to relieve pressures within the system at a much lower point than the point of rupture of the valve seat 2. In this way, the relief valve will continue to function so far as pressure relief is concerned for a very long period of time before the valve seat requires any attention whatsoever. Upon the rupture of the valve seat 2, however, the valve seat may be readily replaced.

If the temperature of the system with which the relief valve is used rises to a dangerous value with or without a corresponding increase in the pressure of the system, then the thermal material 29 that serves to close the supplemental relief passageways of the valve head softens sufficiently to provide supplemental relief passageways through the valve head.

The replacement or repair of the valve head 4 after it has functioned in response to abnormal temperatures developed in the system is greatly facilitated by the unitary arrangement of the valve head, valve gear and valve cap. The cap 6 carries with it the entire assembly of operating parts of the valve structure, when it is removed. The valve head 4 is then unscrewed from the threaded sleeve 25 and is replaced by a new valve head or the fusible inserts are replaced. The relief valve may then be assembled by merely screwing the cap 6 to its desired adjusted position. This is much simpler than renewing the valve seat.

The modified form of the invention that is shown in Figs. 3 and 4 comprises a pressure responsive valve seat that is formed of a pair of concentric rings 32 and 33 that are solely connected by an interposed annular ring 34 of material of substantially the character of the material described in my above mentioned co-pending application. In fact, the assembled valve seat is substantially the same in character and function as the various types of valve seats proposed in my above mentioned application except that the valve seat herein shown carries an additional ring 35 of relatively soft material such as lead, solder or other material that will provide a yielding seating face for the valve head, to insure a fluid tight reseating of the valve head and the valve seat.

The supplemental relief ports 37 of the valve head shown in Fig. 3 are normally closed by suitable plugs of metal or other material that is adapted to melt sufficiently to relieve the system upon the development of abnormal temeperatures. The valve head shown in Fig. 3 is similar in form to the valve head 4 except that the supplemental relief ports 37, which correspond to the supplemental relief ports 30, open on the under face of the valve head beyond its seating face. This valve head 36 is also adapted to be used in connection with a frangible valve seat of such material as will provide a suitable fluid tight seat with the valve head.

The operation of the valve head and seat illustrated in Figs. 3 and 4 is substantially the same as for the corresponding elements for the valve structure shown in Fig. 1. In this particular application of my invention, however, the soft metal seating face is formed on the valve seat rather than on the valve head. For this reason it is deemed unnecessary to set forth a detailed description of the operation of the modified device.

The valve head 40 shown in Fig. 5 is primarily adapted for use in a valve structure having the valve seat 41 formed as an integral part of the casing. In this structure the seating face is preferably formed by forcing a ring 42 of lead or other material into a suitably formed annular groove 43.

The valve head 40 has one or more replaceable plugs 44 of fusible material that are preferably threaded into the side wall of the valve head to provide supplemental relief passageways that open when subjected to predetermined abnormal temperatures.

The plug 44 preferably has a groove 45 formed in its head to facilitate its insertion. A plug of this character may readily be renewed after the original plug has been destroyed by the functioning of the relief valve in response to abnormal excessive temperatures. This form of valve head may be used with the valve gear shown in Fig. 1 or with any other suitable form of relief valve structure.

It will be apparent from a consideration of the specification and the drawings that various modifications of my invention may be made without departing from the spirit and scope of the invention.

What I claim is:

1. A pressure and temperature relief valve comprising a casing having an inlet aperture, a discharge aperture and a pressure responsive friable valve seat between and adjacent to said apertures, a valve head cooperating with said valve seat for closing the communication between said apertures, means for maintaining said valve head on its seat under normal fluid pressures exerted through the inlet aperture and yieldable to permit said valve to open when a predetermined pressure is reached, and a fusible plug mounted in a threaded aperture formed in said valve head and adapted to soften sufficiently to be blown out of said threaded aperture by the normal pressure existing in said inlet aperture, to thereby connect said inlet aperture with said outlet aperture when the temperature to which said valve head is subjected by fluids received in said inlet aperture increases to a predetermined temperature well below temperatures that are destructive to the remainder of said valve structure.

2. A pressure and temperature relief valve comprising a casing having an inlet aperture, a discharge aperture and a pressure responsive friable valve seat between and adjacent to said apertures, a valve head member cooperating with said valve seat for closing the communication between said apertures, means for maintaining said valve head on its seat under normal fluid pressures exerted through the inlet aperture and yieldable to permit said valve to open when said valve head is subjected to a predetermined pressure from fluids in the inlet aperture, and a fusible member adapted to close an aperture in the valve head connecting said inlet aperture with said outlet aperture, said fusible member being adapted to rupture independent of the normal operation of said valve head in the event that said fusible member is subjected to a predetermined abnormal temperature within the range of operation of the remainder of the valve structure.

3. A pressure and temperature relief valve comprising a casing having an inlet aperture, a discharge aperture and a pressure responsive friable valve seat between said apertures, a valve head cooperating with said seat for closing the communication between said apertures, means for maintaining said valve head on said valve seat under normal fluid pressures exerted through the inlet aperture, said means being yieldable to permit said valve to open when a predetermined pressure is reached, said valve head comprising a hollow body terminating at its upper end in a flared valve seat engaging face and at its lower end in a cup-shaped pendant portion, an aperture extending completely through the wall of the cup-shaped portion, and a plug of material adapted to fuse at a predetermined temperature within the operating range of the remainder of the valve structure, said aperture being threaded to receive a replacement plug of fusible material when the original plug of fusible material is destroyed.

4. A relief valve structure comprising a valve casing having inlet and outlet passages, a pressure responsive valve head adapted to close an aperture between said passages and a supplemental pressure responsive friable element also interposed between said passages, said pressure responsive element being adapted to be subjected to the pressure of the system with which said valve is used and to rupture when the pressure of the system exceeds a predetermined intensity to thereby connect said inlet and outlet passages independent of the operation of said valve head, and a thermally responsive element interposed between said passages and adapted to provide a connection between said passages when said thermally responsive element is subjected to a predetermined temperature independent of the pressure existing in the system, said thermally responsive element being carried by the valve head and movable therewith.

5. A relief valve structure comprising a cast metal valve casing having an annular shoulder and a screw threaded portion formed therein immediately adjoining said shoulder, an annular valve seat adapted to be removably mounted on said shoulder, a valve cage of cylindrical form having a screw threaded portion at one end thereof adapted to engage the correspondingly threaded portion of said casing to removably clamp said valve seat on said annular shoulder, a portion of said valve cage on the end thereof opposite the said threaded end extending beyond the side walls of said casing for the convenient removal of said valve cage, a valve head having relief ports communicating with an annular groove, an insert of fusible material adapted to fill said ports and groove and to provide a relatively soft and yielding seating face for said valve head, valve gear disposed partially within said valve cage and adapted to exert seating pressure on said valve head, and a valve cap adapted to enclose said valve cage, and constituting means for adjusting the yielding pressure exerted by said valve gear on said valve head.

In testimony whereof I affix my signature.

ARTHUR FRIEDMAN.